(12) United States Patent
Kim

(10) Patent No.: US 8,922,975 B2
(45) Date of Patent: Dec. 30, 2014

(54) MULTILAYER CERAMIC CAPACITOR

(75) Inventor: Hyung Joon Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/421,450

(22) Filed: Mar. 15, 2012

(65) Prior Publication Data

US 2013/0058006 A1  Mar. 7, 2013

(30) Foreign Application Priority Data

Sep. 2, 2011 (KR) .................. 10-2011-0088996

(51) Int. Cl.
*H01G 4/005* (2006.01)
*H01G 4/06* (2006.01)
*H01G 4/12* (2006.01)
*H01G 4/232* (2006.01)
*H01G 4/30* (2006.01)

(52) U.S. Cl.
CPC .............. *H01G 4/12* (2013.01); *H01G 4/232* (2013.01); *H01G 4/30* (2013.01)
USPC .......................................... 361/303; 361/311

(58) Field of Classification Search
USPC .................................................. 361/303, 311
See application file for complete search history.

(56) References Cited

U.S. PATENT DOCUMENTS

| | | | | |
|---|---|---|---|---|
| 6,292,351 B1 * | 9/2001 | Ahiko et al. | ................ | 361/306.3 |
| 6,661,640 B2 * | 12/2003 | Togashi | ..................... | 361/306.3 |
| 6,683,782 B2 * | 1/2004 | Duva | ............................. | 361/311 |
| 7,054,137 B1 * | 5/2006 | Barber et al. | ............... | 361/321.1 |
| 7,180,723 B2 * | 2/2007 | Togashi et al. | ................ | 361/303 |
| 7,230,815 B2 * | 6/2007 | Yoon et al. | ..................... | 361/303 |
| 7,292,429 B2 * | 11/2007 | Randall et al. | ................ | 361/303 |
| 7,936,554 B2 * | 5/2011 | Itamura et al. | ................ | 361/303 |
| 8,081,485 B2 * | 12/2011 | Wischnat | ...................... | 361/760 |
| 8,098,478 B2 * | 1/2012 | Niki et al. | ..................... | 361/303 |
| 8,315,033 B2 * | 11/2012 | Takashima et al. | ........... | 361/303 |

(Continued)

FOREIGN PATENT DOCUMENTS

JP  01186607 A  *  7/1989
JP  06-013259 A     1/1994

(Continued)

OTHER PUBLICATIONS

Japanese Office Action, w/English translation thereof, issued in Japanese Patent Application No. JP 2012-064942 dated Sep. 24, 2013.

(Continued)

*Primary Examiner* — Eric Thomas
(74) *Attorney, Agent, or Firm* — McDermott Will & Emery LLP (57) ABSTRACT

There is provided a multilayer ceramic capacitor including: a ceramic body; first and second internal electrodes provided within the ceramic body and including lead-out portions exposed to a first surface of the ceramic body and having an overlapping area, the overlapping area being exposed to the first surface of the ceramic body; external electrodes formed on the first surface of the ceramic body and connected to the respective lead-out portions; and an insulation layer formed on the first surface of the ceramic body and on third and fourth surfaces thereof connected to the first surface, wherein the lead-out portions have a predetermined interval from the third or fourth surface of the ceramic body.

11 Claims, 5 Drawing Sheets

(56) References Cited

U.S. PATENT DOCUMENTS

| | | | |
|---|---|---|---|
| 2004/0266087 A1 | 12/2004 | Greier et al. | |
| 2005/0286203 A1* | 12/2005 | Togashi et al. | 361/301.4 |
| 2008/0186652 A1 | 8/2008 | Lee et al. | |
| 2009/0073634 A1* | 3/2009 | Lee et al. | 361/303 |
| 2010/0149769 A1* | 6/2010 | Lee et al. | 361/768 |

FOREIGN PATENT DOCUMENTS

| | | |
|---|---|---|
| JP | 07-122455 | 5/1995 |
| JP | 2005-505129 A | 2/2005 |
| JP | 2008-193055 A | 8/2008 |
| JP | 2009-026872 A | 2/2009 |
| JP | 2009-054973 A | 3/2009 |
| KR | 10-2008-0073193 A | 8/2008 |

OTHER PUBLICATIONS

Korean Office Action issued in Korean Application No. 10-2011-0088996 dated May 23, 2014, w/English translation.

Japanese Office Action dated Sep. 5, 2014 issued in corresponding Japanese Patent Application No. 2012-064942.

* cited by examiner

FIG. 9

MULTILAYER CERAMIC CAPACITOR

CROSS-REFERENCE TO RELATED APPLICATIONS

This application claims the priority of Korean Patent Application No. 10-2011-0088996 filed on Sep. 2, 2011, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor having excellent capacitance and low equivalent series inductance (ESL).

2. Description of the Related Art

Generally, electronic components using a ceramic material, such as a capacitor, an inductor, a piezoelectric element, a varistor, or a thermistor, or the like, include a ceramic body formed of a ceramic material, internal electrodes formed within the ceramic body, and external electrodes mounted on surfaces of the ceramic body so as to be connected to the internal electrodes.

Among ceramic electronic components, a multilayer ceramic capacitor (MLCC) includes a plurality of laminated dielectric layers, internal electrodes disposed to face each other, in which each pair of internal electrodes has one of the dielectric layers disposed therebetween, and external electrodes electrically connected to the internal electrodes.

The multilayer ceramic capacitor provides the advantages of compactness, high capacitance, and ease of mounting, so it is therefore used extensively in mobile communications devices such as notebook computers, personal digital assistances (PDAs), and cellular phones.

Recently, as electronic products have been miniaturized and have become multi-functionalized, chip components have also tended to have been miniaturized and multi-functionalized. Accordingly, there is a need to miniaturize the multilayer ceramic capacitor and increase the capacitance thereof.

In addition, the multilayer ceramic capacitor has been usefully used as a bypass capacitor disposed in a large scale integration (LSI) power supply circuit. The multilayer ceramic capacity needs to have the capability to effectively remove high frequency noise in order to serve as a bypass capacitor. This demand has been further increased in accordance with the trend toward electronic devices having high frequencies. The multilayer ceramic capacitor used as the bypass capacitor may be electrically connected to a mounting pad on a circuit board through soldering, and the mounting pad may be connected to other external circuits through wiring patterns on, or conductive vias in, the circuit board.

The multilayer ceramic capacitor has equivalent series resistance (ESR) and equivalent series inductance (ESL) components in addition to a capacitance component. These ESR and ESL components may hinder a function of the bypass capacitor.

Particularly, ESL increases capacitor inductance at high frequencies to thereby hinder high frequency noise removal characteristics.

SUMMARY OF THE INVENTION

An aspect of the present invention provides a multilayer ceramic capacitor having excellent capacitance and low equivalent series inductance (ESL).

According to an aspect of the present invention, there is provided a multilayer ceramic capacitor including: a ceramic body; first and second internal electrodes provided within the ceramic body and including lead-out portions exposed to a first surface of the ceramic body and having an overlapping area, the overlapping area being exposed to the first surface of the ceramic body; external electrodes formed on the first surface of the ceramic body and connected to the respective lead-out portions; and an insulation layer formed on the first surface of the ceramic body and on third and fourth surfaces thereof connected to the first surface, wherein the lead-out portions have a predetermined interval from the third or fourth surface of the ceramic body.

The first internal electrode may include first and second lead-out portions exposed to the first surface of the ceramic body while having a predetermined interval therebetween. The first lead-out portion may have a predetermined interval from the third surface of the ceramic body, and the second lead-out portion may have a predetermined interval from the fourth surface of the ceramic body.

The second internal electrode may include a first lead-out portion having a predetermined interval from the third and fourth surface of the ceramic body.

The first and second internal electrodes may have ends exposed to the third and fourth surfaces of the ceramic body.

The first and second internal electrodes may be disposed perpendicularly to a mounting surface of the ceramic body.

The insulation layer maybe formed of a ceramic slurry.

The external electrodes may be connected to portions of the lead-out portions of the first and second internal electrodes that are not overlapped with each other.

The insulation layer formed on the first surface of the ceramic body may entirely cover the overlapping area of the lead-out portions of the first and second internal electrodes.

The insulation layer formed on the third or fourth surface of the ceramic body may be connected to a dielectric layer exposed to the third or fourth surface of the ceramic body.

The insulation layer formed on the first surface of the ceramic body may have a height lower than those of the first and second external electrodes measured from the first surface of the ceramic body.

The first and second internal electrodes may include lead-out portions exposed to a second surface of the ceramic body opposed to the first surface.

The first internal electrode may include third and fourth lead-out portions exposed to the second surface of the ceramic body while having a predetermined interval therebetween.

The third lead-out portion may have a predetermined interval from the third surface of the ceramic body, and the fourth lead-out portion may have a predetermined interval from the fourth surface of the ceramic body.

The second internal electrode may include a second lead-out portion exposed to the second surface of the ceramic body and having a predetermined interval from the third and fourth surfaces of the ceramic body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 1:
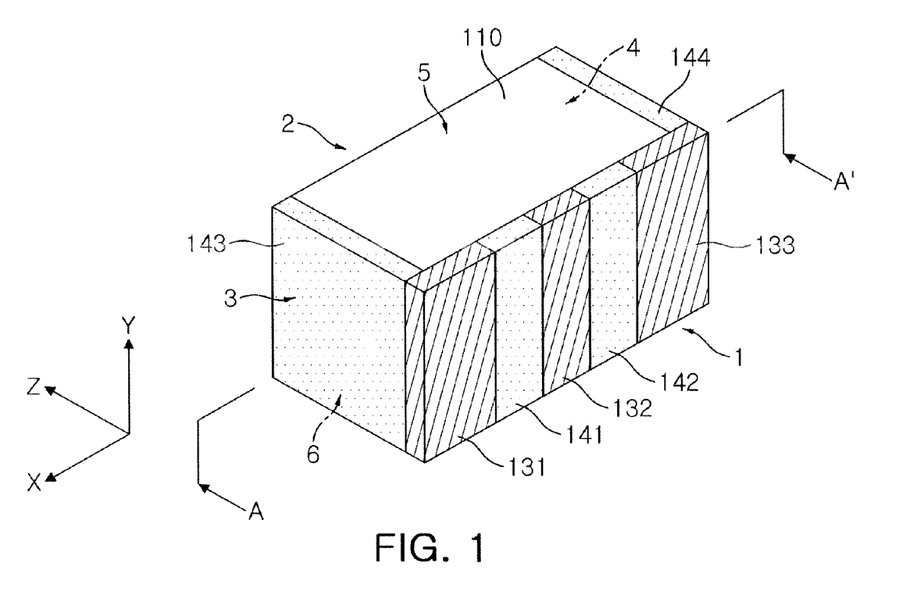
FIG. 1 is a schematic perspective view showing a multilayer ceramic capacitor according to an embodiment of the present invention.
Figure 2:
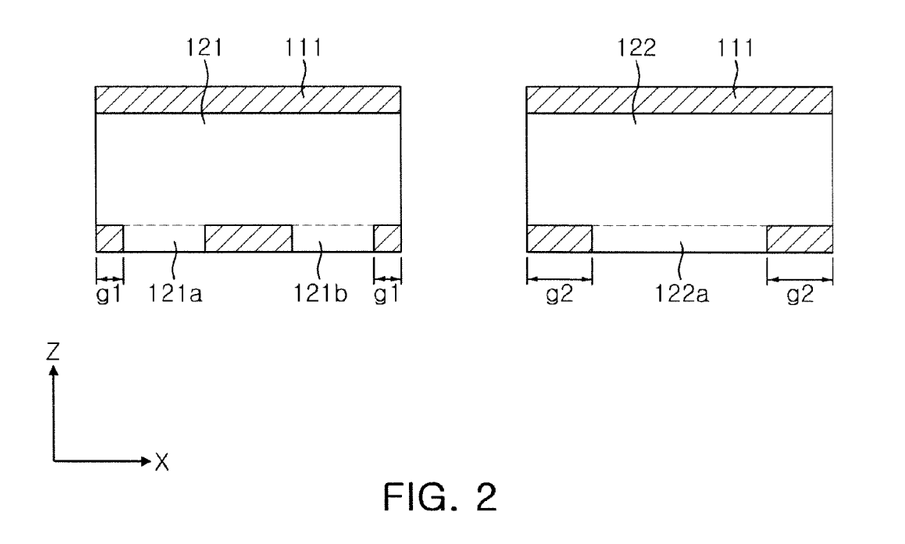
FIG. 2 is cross-sectional views showing a structure of internal electrodes of the multilayer ceramic capacitor shown in FIG. 1.
Figure 3:
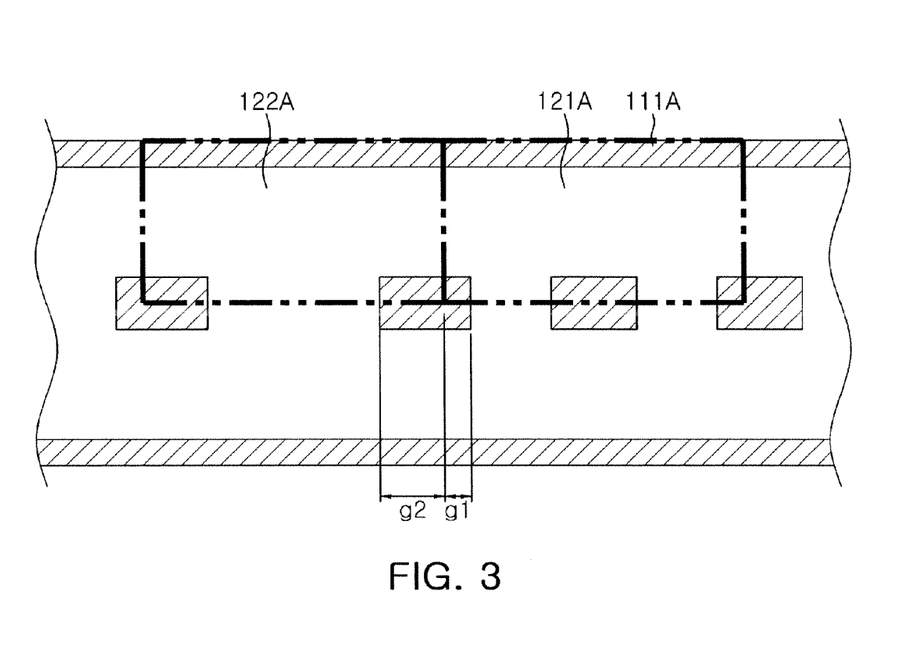
FIG. 3 is a schematic top plan view showing a portion of a process of manufacturing the multilayer ceramic capacitor shown in FIG. 1.
Figure 4:
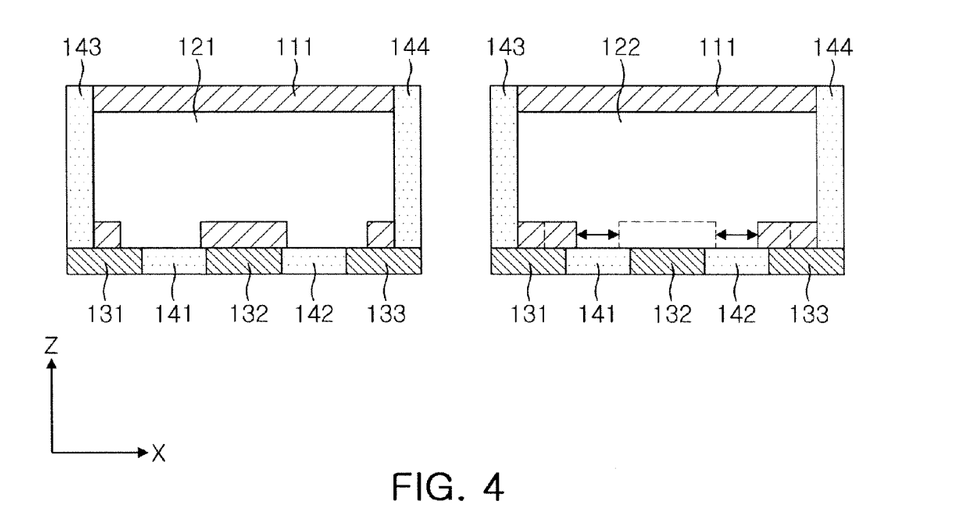
FIG. 4 is cross-sectional views taken along line A-A' of FIG. 1.

FIG. 1 is a schematic perspective view showing a multilayer ceramic capacitor according to an embodiment of the present invention; and FIG. 2 is cross-sectional views showing a structure of internal electrodes of the multilayer ceramic capacitor shown in FIG. 1. FIG. 3 is a schematic top plan view showing a portion of a process of manufacturing the multilayer ceramic capacitor shown in FIG. 1. FIG. 4 is cross-sectional views taken along line A-A' of FIG. 1.

The multilayer ceramic capacitor according to the present embodiment may be a three-terminal vertically laminated or vertical multilayer capacitor. Here, "vertically laminated or vertical multilayer capacitor" means that internal electrodes laminated within a capacitor are disposed perpendicularly to a mounting surface of a circuit board, and "three-terminal" means that three terminals are connected to the circuit board as the capacitor terminals.

Referring to FIGS. 1 through 4, the multilayer ceramic capacitor according to the present embodiment may include a ceramic body 110; internal electrodes 121 and 122 formed within the ceramic body; and insulation layers 141 to 144 and external electrodes 131 to 133 formed on one surface of the ceramic body.

According to the present embodiment, the ceramic body 110 may have first and second surfaces 1 and 2 opposing each other, and third to sixth surfaces 3 to 6 connecting the first and second surfaces 1 and 2 to each other. The shape of the ceramic body 110 is not particularly limited but may be a rectangular parallelepiped having the first to sixth surfaces, as shown. According to the embodiment of the present invention, the third and fourth surfaces 3 and 4 may oppose each other, and the fifth and sixth surfaces 5 and 6 may oppose each other. According to the embodiment of the present invention, the first surface 1 of the ceramic body may be amounting surface disposed on a mounting area of a circuit board.

According to the embodiment of the present invention, an x-direction refers to a direction in which first and second external electrodes, having a predetermined interval therebetween, are formed; a y-direction refers to a direction in which the internal electrodes, having dielectric layers therebetween, are laminated; and a z-direction refers to a direction in which the internal electrodes are mounted on the circuit board.

According to the embodiment of the present invention, the ceramic body 110 may be formed by laminating a plurality of dielectric layers 111. The plurality of dielectric layers 111 configuring the ceramic body 110 may be in a sintered state and may be integrated such that boundaries therebetween may not be readily apparent.

The dielectric layer 111 may be formed by firing a ceramic green sheet containing a ceramic powder, an organic solvent, and an organic binder. Here, the ceramic powder may have a high dielectric constant, and a barium titanate ($BaTiO_3$) based material, a strontium titanate ($SrTiO_3$) based material, or the like, may be used therefor. However, the ceramic powder is not limited thereto.

According to the embodiment of the present invention, the ceramic body 110 may include the internal electrodes formed therein.

FIG. 2 is cross-sectional views showing the dielectric layer 111 configuring the ceramic body 110 and the internal electrodes 121 and 122 formed on the dielectric layer. According to the embodiment of the present invention, the first internal electrode 121 having a first polarity and the second internal electrode 122 having a second polarity may be formed as a pair and be disposed to face each other in the y-direction, having the dielectric layer 111 interposed therebetween. According to the embodiment of the present invention, the first and second internal electrodes 121 and 122 may be disposed perpendicularly to the mounting surface, that is, the first surface 1, of the multilayer ceramic capacitor.

In the embodiments of the present invention, first and second electrodes may have different polarities, and first and third electrodes may have the same polarity.

According to the embodiment of the present invention, the first and second internal electrodes may be formed of a conductive paste containing a conductive metal. The conductive metal may be Ni, Cu, Pd, or an alloy thereof but is not limited thereto.

The internal electrode may be printed on a ceramic green sheet configuring the dielectric layer using a conductive paste through a printing method such as a screen printing method or a gravure printing method. The ceramic green sheets having the internal electrodes printed thereon may be alternately laminated and fired to thereby form the ceramic body.

Referring to FIGS. 2 and 3, the first and second internal electrodes 121 and 122 may have respective lead-out portions 121a, 121b, and 122a so as to be connected to the external electrodes having different polarities, and the lead-out portions 121a, 121b, and 122a may be exposed to the first surface 1 of the ceramic body. According to the embodiment of the present invention, the multilayer ceramic capacitor may be a vertically laminated or vertical multilayer capacitor, and the lead-out portions of the first and second internal electrodes may be exposed to the same surface of the ceramic body.

According to the embodiment of the present invention, the lead-out portion of the internal electrode is an area in which a conductor pattern forming the internal electrode has an increased width W to thereby be exposed to one surface of the ceramic body.

According to the present embodiment, the first internal electrode may have the two lead-out portions 121a and 121b. The two lead-out portions 121a and 121b of the first internal electrode may have a predetermined interval therebetween, and be exposed to the first surface of the ceramic body.

According to the embodiment of the present invention, the first lead-out portion 121a of the first internal electrode may be exposed to the first surface while having a predetermined interval g1 from the third surface of the ceramic body, and the second lead-out portion 121b of the first internal electrode may be exposed to the first surface while having a predetermined interval g1 from the fourth surface thereof.

According to the present embodiment, the second internal electrode may have a single lead-out portion 122a. The first lead-out portion 122a of the second internal electrode may be exposed to the first surface of the ceramic body while having predetermined intervals (g2) from the third and fourth surfaces of the ceramic body.

The two lead-out portions 121a and 121b of the first internal electrode may have respective overlapping areas with the lead-out portion 122a of the second internal electrode. According to the embodiment of the present invention, the two lead-out portions 121a and 121b of the first internal electrode and the lead-out portion 122a of the second internal electrode may be partially overlapped in the area exposed to the first surface of the ceramic body. A detailed description thereof will be described below.

According to the embodiment of the present invention, ends of the first and second internal electrodes maybe exposed to the third and fourth surfaces of the ceramic body. The insulation layers are formed on the third and fourth surfaces of the ceramic body, whereby a short-circuit between the internal electrodes may be prevented.

According to the embodiment of the present invention, the first and second internal electrodes may be formed to have a margin portion on only the second surface of the ceramic body and may be exposed to the third and fourth surfaces thereof without a margin portion. In addition, the internal electrodes may be formed to have only the minimal intervals g1 and g2 in the first, third, and fourth surfaces. In addition, the lead-out portions of the first and second internal electrodes maybe partially overlapped with each other with respect to the first surface, such that the internal electrodes may be formed to have increased areas. Therefore, an overlapping area between the first and second internal electrodes is increased, whereby a high capacitance multilayer ceramic capacitor may be realized.

Generally, the first and second internal electrodes form capacitance in an overlapping area, and the lead-out portions connected to the external electrodes having different polarities do not have an overlapping area. However, according to the embodiment of the present invention, the lead-out portions of the first and second internal electrodes may have an overlapping area.

FIG. 3 is a schematic top plan view showing a portion of a process of manufacturing the multilayer ceramic capacitor shown in FIG. 1.

Referring to FIG. 3, internal electrode patterns 121A and 122A are formed on a ceramic green sheet 111A in order to form the first and second internal electrodes. The ceramic green sheet may be fired to form the dielectric layer 111 of FIG. 2.

The ceramic green sheets including the internal electrode patterns formed thereon are stacked and cut, whereby ceramic bodies may be manufactured as individual chip units. For process convenience, a single internal electrode pattern may be formed, and a plurality of first and second internal electrodes as shown in FIG. 2 may be formed by a process of cutting the internal electrode pattern. A cutting line is represented by a two point chained line in FIG. 3. When the internal electrode pattern is cut along the cutting line, the internal electrode pattern 121A may become the first internal electrode, and the internal electrode pattern 122A may become the second internal electrode. Referring to FIG. 3, the first and second internal electrode patterns 121A and 122A may be formed to have lead-out portions, and the lead-out portions may have the intervals g1 and g2 formed therebetween. The cutting line of the first and second internal electrode patterns may be positioned on the intervals g1 and g2.

In a case in which the cutting line is formed on the lead-out portions of the first and second internal electrode patterns, the lead-out portions of the first and second internal electrodes may not form an overlapping area as designed. The lead-out portions of the first and second internal electrodes may be short-circuited or may fail to be only partially overlapped with each other so as to be connected to the external electrodes having different polarities on an exposed surface of the ceramic body.

However, according to the embodiment of the present invention, the intervals g1 and g2 are formed between the lead-out portions, whereby a margin of error of the cutting line of the first and second internal electrode patterns may be reduced. That is, when the cutting line is formed on the intervals g1 and g2, the first and second internal electrodes are not short-circuited or are not outside of a design range of the present embodiment, whereby cutting precision may be improved.

Referring to FIG. 4, the external electrodes may be formed on one surface of the ceramic body so as to be connected to the internal electrodes. More specifically, the first external electrode 131 maybe formed to be connected to the first lead-out portion 121a of the first internal electrode exposed to the first surface of the ceramic body, and the third external electrode 133 may be formed to be connected to the second lead-out portion 121b of the first internal electrode exposed to the first surface of the ceramic body. In addition, the second external electrode 132 may be formed to be connected to the first lead-out portion 122a of the second internal electrode exposed to the first surface of the ceramic body.

The first external electrode 131 may be connected to a portion of the first lead-out portion 121a of the first internal electrode that does not overlap the first lead-out portion 122a of the second internal electrode. The third external electrode 133 may be connected to a portion of the second lead-out portion 121b of the first internal electrode that does not overlap the first lead-out portion 122a of the second internal electrode. The second external electrode 132 may be connected to a portion of the first lead-out portion 122a of the second internal electrode that does not overlap the first and second lead-out portions 121a and 121b of the first internal electrode.

In the right view of FIG. 4, the overlapping areas between the first and second lead-out portions 121a and 121b of the first internal electrode and the lead-out portion 122a of the second internal electrode are denoted by arrows, and the lead-out portion of the second internal electrode that does not overlap the lead-out portions of the first internal electrode is denoted by a dotted line.

According to the embodiment of the present invention, the lead-out portions of the first internal electrode and the lead-out portion of the second internal electrode may have the overlaping areas and be connected to the external electrodes having different polarities.

According to the embodiment of the present invention, the insulation layers 141 to 144 may be formed on one surface of the ceramic body. More specifically, the first and second insulation layers 141 and 142 may be formed on the first surface of the ceramic body, and the third and fourth insulation layers 143 and 144 may be formed on the third and fourth surfaces thereof, respectively.

The first insulation layer 141 formed on the first surface of the ceramic body may be formed between the first and second external electrodes 131 and 132, and the second insulation layer 142 formed on the first surface of the ceramic body may be formed between the second and third external electrodes 132 and 133. The first and second insulation layers 141 and 142 may be formed to cover the lead-out portions 121a and 121b of the first internal electrode and the lead-out portion 122a of the second internal electrode that are exposed to the first surface. The first and second insulation layers 141 and 142 maybe formed to entirely cover the overlapping areas between the first and second lead-out portions and be formed to cover the exposed areas of the lead-out portions of the first internal electrode and the lead-out portion of the second internal electrode.

According to the embodiment of the present invention, as shown in FIG. 3, the first and second insulation layers 141 and 142 may be formed to completely cover the first surface of the ceramic body between the first and second external electrodes.

In addition, although not shown, according to the embodiment of the present invention, the first and second insulation layers 141 and 142 may be formed to cover only the overlapping areas between the lead-out portions 121a and 121b of the first internal electrode and the lead-out portion 122a of the second internal electrode while having predetermined intervals from the first to third external electrodes 131 to 133.

According to the embodiment of the present invention, the third and fourth insulation layers 143 and 144 may respectively be formed on the third and fourth surfaces of the ceramic body to which the ends of the first and second internal electrodes 121 and 122 are exposed.

The third insulation layer 143 may be connected to a margin portion dielectric layer formed on the second surface of the ceramic body. In addition, as shown in FIG. 2, the first lead-out portion 121a of the first internal electrode is formed to have a predetermined interval g1 from the third surface of the ceramic body, such that the dielectric layer is exposed to the third surface of the ceramic body. The third insulation layer 143 may be connected to the dielectric layer exposed to the third surface of the ceramic body.

The fourth insulation layer 144 may be connected to a margin portion dielectric layer formed on the second surface of the ceramic body. In addition, as shown in FIG. 2, the second lead-out portion 121b of the first internal electrode is formed to have a predetermined interval g1 from the fourth surface of the ceramic body, such that the dielectric layer is exposed to the fourth surface of the ceramic body. The fourth insulation layer 144 may be connected to the dielectric layer exposed to the fourth surface of the ceramic body.

According to the embodiment of the present invention, the insulation layer may be formed of the same material as or similar material to a material of the dielectric layer. When the insulation layer is connected to the dielectric layer, adhesion strength between the insulation layer ad the ceramic body may be improved.

According to the embodiment of the present invention, the insulation layers 141 to 144 may be formed of a ceramic slurry. A position and a height of each insulation layer may be adjusted with reference to an amount and a shape of the ceramic slurry. The insulation layers 141 to 144 may be formed by applying a ceramic slurry to the ceramic body formed by a firing process and then firing the ceramic slurry.

Alternatively, the insulation layer may be formed by forming a ceramic slurry for the insulation layer on the ceramic green sheet configuring the ceramic body and then firing the ceramic slurry together with the ceramic green sheet.

A method of forming the ceramic slurry is not particularly limited. For example, the ceramic slurry may be formed by spraying, applying with a roller, coating, attaching or the like.

According to the embodiment of the present invention, the insulation layers 141 to 144 cover the lead-out portions 121a, 121b, and 122a and the ends of the first and second internal electrodes 121 and 122 that are exposed to one surface of the ceramic body, whereby a short-circuit between the internal electrodes may be prevented and an internal defect such as deterioration in humidity resistance characteristics, or the like, may be prevented.

According to the embodiment of the present invention, since even the lead-out portions of the first and second internal electrodes are overapped, capacitance of the multilayer ceramic capacitor may be increased. In addition, a distance between the first and second internal electrodes to which external polarities are applied may be relatively close, such that a current loop may be shortened. Therefore, equivalent series inductance (ESL) may be reduced.

Figure 5:
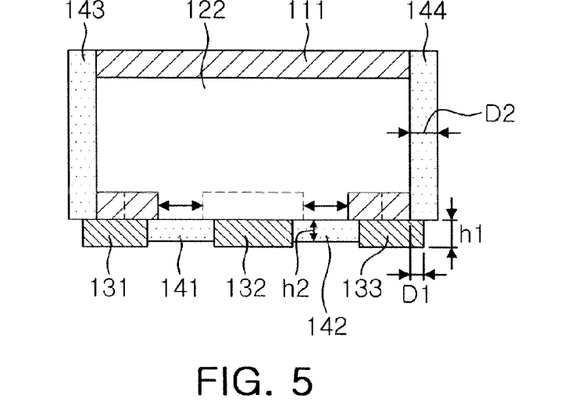
FIG. 5 is a cross-sectional view showing a multilayer ceramic capacitor according to another embodiment of the present invention.

FIG. 5 is a cross-sectional view showing a multilayer ceramic capacitor according to another embodiment of the present invention. Hereinafter, components different from those of the above-mentioned embodiments may mainly be described and a detailed description of the same components will be omitted.

Referring to FIG. 5, first to third external electrodes 131 to 133 may be formed on a first surface of a ceramic body, similar to FIG. 4. In addition, first and second insulation layers 141 and 142 may be formed on the first surface of the ceramic body, a third insulation layer 143 may be formed on a third surface thereof, and a fourth insulation layer 144 may be formed on a fourth surface thereof.

According to the embodiment of the present invention, the first insulation layer 141 may be formed between the first and second external electrodes 131 and 132, and the second insulation layer 142 maybe formed between the second and third external electrodes 132 and 133.

According to the embodiment of the present invention, the first and second insulation layers 141 and 142 may have a height h2 lower than a height h1 of the first to third external electrode 131 to 133. The heights of the insulation layers and the external electrodes may be measured based on the first surface.

According to the embodiment of the present invention, the heights of the first and second insulation layers 141 and 142 are lower than those of the first to third external electrodes, such that the multilayer ceramic capacitor may be more stably mounted on the circuit board.

In addition, although not shown, the first and second insulation layers may have different heights.

According to the embodiment of the present invention, the third or fourth insulation layer 143 or 144 may have a thickness D2 greater than a thickness D1 of the first or third external electrode 131 or 133. The thicknesses of the insulation layers and the external electrodes may be measured based on the third or fourth surface.

In addition, although not shown, according to the embodiment of the present invention, the third or fourth insulation layer may have a thickness less than that of the external electrode.

Figure 6:
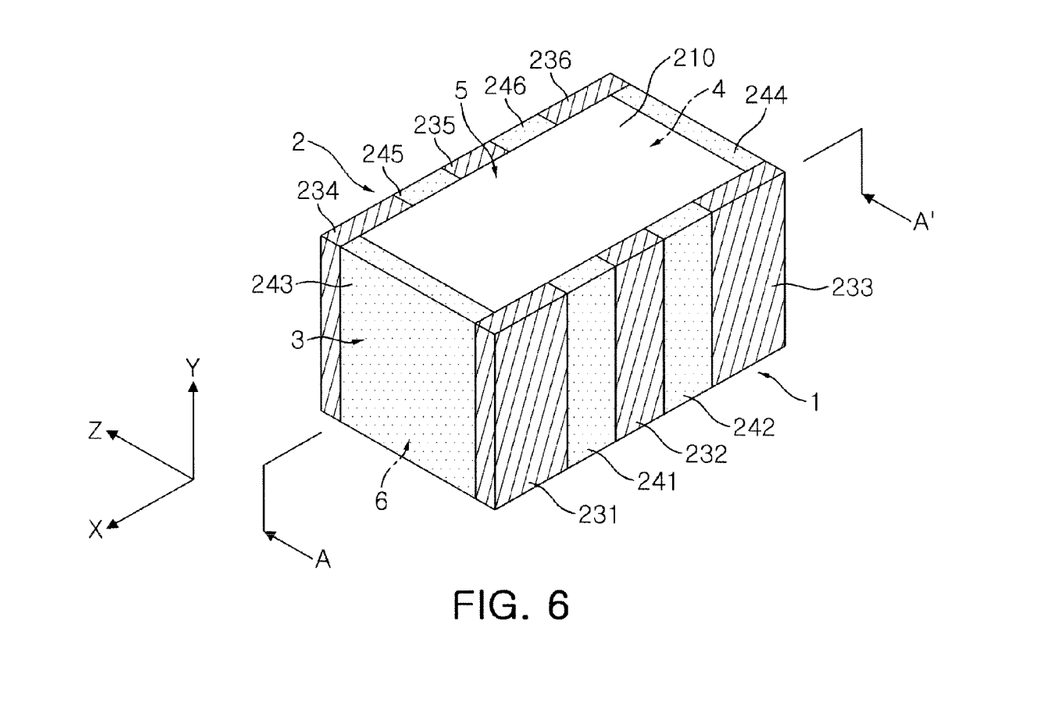
FIG. 6 is a schematic perspective view showing a multilayer ceramic capacitor according to another embodiment of the present invention.
Figure 7:
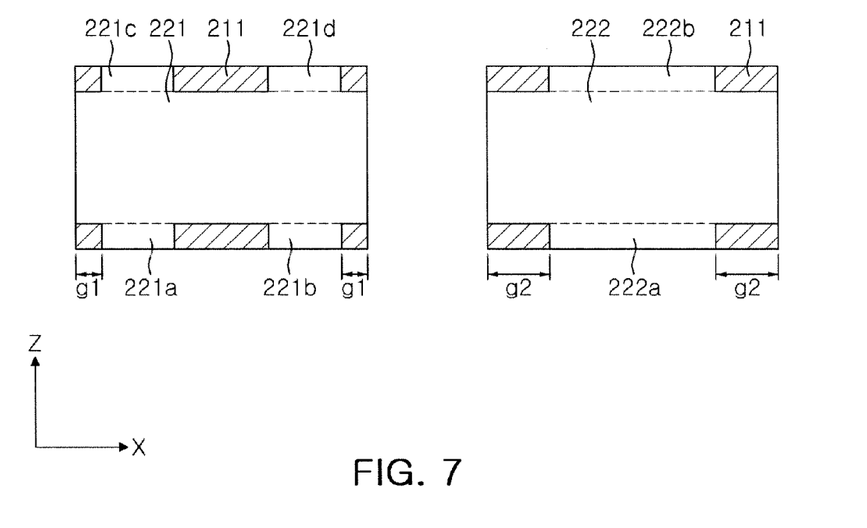
FIG. 7 is cross-sectional views showing a structure of internal electrodes of the multilayer ceramic capacitor shown in FIG. 6.
Figure 8:
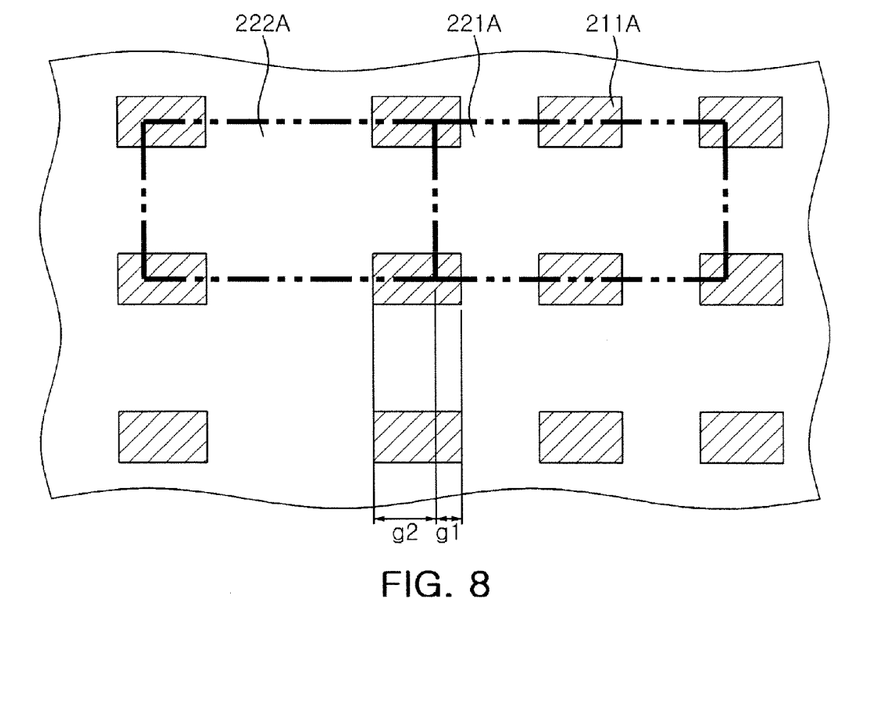
FIG. 8 is a schematic top plan view showing a portion of a process of manufacturing the multilayer ceramic capacitor shown in FIG. 6.
Figure 9:
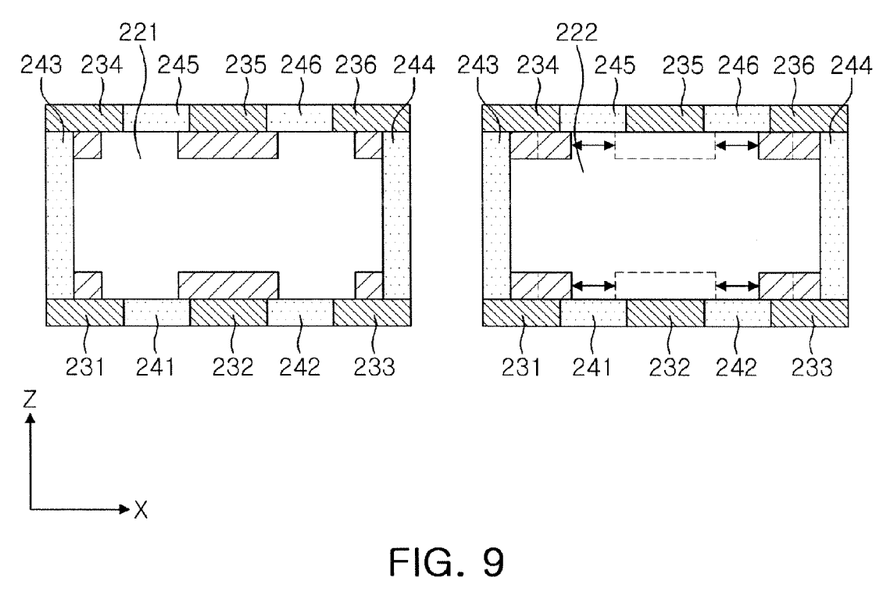
FIG. 9 is cross-sectional views of the multilayer ceramic capacitor shown in FIG. 6.

FIGS. 6 through 9 show a multilayer ceramic capacitor according to another embodiment of the present invention. FIG. 6 is a schematic perspective view showing the multilayer ceramic capacitor according to the present embodiment; FIG. 7 is cross-sectional views showing a structure of internal electrodes of the multilayer ceramic capacitor shown in FIG. 6; and FIG. 8 is a schematic top plan view showing a portion of a process of manufacturing the multilayer ceramic capacitor shown in FIG. 6. FIG. 9 is cross-sectional views of the multilayer ceramic capacitor shown in FIG. 6. Hereinafter, components different from those of the above-mentioned embodiments maybe mainly described and a detailed description of the same components will be omitted.

Referring to FIGS. 6 through 9, the multilayer ceramic capacitor according to the present embodiment may be a six-terminal vertically laminated or vertical multilayer capacitor. The "six-terminal" means that six terminals are connected to a circuit board as the capacitor terminals.

The multilayer ceramic capacitor according to the present embodiment may include a ceramic body 210; internal electrodes 221 and 222 formed within the ceramic body; and insulation layers 241 to 246 and external electrodes 231 to 236 formed on one surface of the ceramic body.

FIG. 7 is a cross-sectional view showing the dielectric layer 211 configuring the ceramic body 210 and the internal electrodes 221 and 222 formed in the dielectric layer.

According to the embodiment of the present invention, the first internal electrode 221 having a first polarity and the second internal electrode 222 having a second polarity may be formed as a pair and be disposed to face each other in the y-direction, having the dielectric layer 211 interposed therebetween. According to the embodiment of the present invention, the first and second internal electrodes 221 and 222 may be disposed perpendicularly to the mounting surface of the multilayer ceramic capacitor.

According to the present embodiment, the mounting surface of the multilayer ceramic capacitor may be a first surface or a second surface facing the first surface.

Referring to FIGS. 7 to 9, the first and second internal electrodes 221 and 222 may have lead-out portions 221a, 221b, 221c and 221d and lead-out portions 222a and 222d, respectively, so as to be connected to the external electrodes having different polarities.

According to the embodiment of the present invention, the multilayer ceramic capacitor may be the vertically laminated or vertical multilayer capacitor, and the lead-out portions of the first and second internal electrodes may be exposed to the same surface of the ceramic body.

According to the embodiment of the present embodiment, the first internal electrode may have the four lead-out portions 221a to 221d. According to the embodiment of the present invention, the two lead-out portions 221a and 221b of the first internal electrode may be exposed to the first surface of the ceramic body, having a predetermined interval therebetween, and the other two lead-out portions 221c and 221d of the first internal electrode may be exposed to the second surface thereof opposed to the first surface of the ceramic body, having a predetermined interval therebetween.

According to the embodiment of the present invention, the first lead-out portion 221a of the first internal electrode may be exposed to the first surface while having a predetermined interval g1 from the third surface of the ceramic body, and the second lead-out portion 221b of the first internal electrode may be exposed to the first surface while having a predetermined interval g1 from the fourth surface thereof. Likewise, the third lead-out portion 221c of the first internal electrode may be exposed to the second surface while having a predetermined interval g1 from the third surface of the ceramic body, and the fourth lead-out portion 221d of the first internal electrode may be exposed to the second surface while having a predetermined interval g1 from the fourth surface thereof.

According to the present embodiment, the second internal electrode may have the two lead-out portions 221a and 221b. According to the embodiment of the present invention, the first lead-out portion 222a of the second internal electrode may be formed while having a predetermined interval g2 from the third and fourth surfaces of the ceramic body, and may be exposed to the first surface thereof. The second lead-out portion 222b of the second internal electrode may be formed while having a predetermined interval g2 from the third and fourth surfaces thereof, and may be exposed to the second surface thereof opposed to the first surface.

Each of the first and second lead-out portions 221a and 221b of the first internal electrode may have an overlapping area with the first lead-out portion 222a of the second internal electrode. More specifically, the first and second lead-out portions 221a and 221b of the first internal electrode and the first lead-out portion 222a of the second internal electrode may be partially overlapped in the areas exposed to the first surface of the ceramic body.

Likewise, each of the third and fourth lead-out portions 221c and 221d of the first internal electrode may have an overlapping area with the second lead-out portion 222b of the second internal electrode. More specifically, the third and fourth lead-out portions 221c and 221d of the first internal electrode and the second lead-out portion 222b of the second internal electrode may be partially overlapped in the areas exposed to the second surface of the ceramic body. A detailed description thereof will be described below.

According to the embodiment of the present invention, ends of the first and second internal electrodes 221 and 222 may be exposed to the third and fourth surfaces of the ceramic body. The insulation layers are formed on the third and fourth surfaces of the ceramic body, whereby a short-circuit between the first and second internal electrodes may be prevented.

According to the embodiment of the present invention, the first and second internal electrodes may be formed to have only the minimal intervals g1 and g2 on the dielectric layer of the ceramic body. In addition, the lead-out portions of the first internal electrode and the lead-out portions of the second internal electrode maybe partially overlapped with each other, such that the internal electrodes may be formed to have increased areas on the dielectric layer. Therefore, the overlapping areas between the first and second internal electrodes is increased, whereby a high capacitance multilayer ceramic capacitor may be realized.

FIG. 8 is a schematic top plan view showing a portion of a process of manufacturing the multilayer ceramic capacitor shown in FIG. 6.

Referring to FIG. 8, internal electrode patterns 221A and 222A are formed on a ceramic green sheet 211A in order to form the first and second internal electrodes. The ceramic green sheet is fired to form the dielectric layer 211 shown in FIG. 7.

A cutting line is represented by a two point chained line in FIG. 8. When the internal electrode pattern is cut along the cutting line, the internal electrode pattern 221A may become the first internal electrode, and the internal electrode pattern 222A may become the second internal electrode.

Referring to FIG. 8, the first and second internal electrode patterns 221A and 222A may be formed to have lead-out portions, wherein the lead-out portions may have intervals g1 and g2 formed therebetween. The cutting line of the first and second internal electrode patterns may be positioned on the intervals g1 and g2.

As described above, according to the embodiment of the present invention, the intervals g1 and g2 are formed between the lead-out portions, whereby a margin of error of the cutting line of the first and second internal electrode patterns may be reduced. That is, when the cutting line is formed on the intervals g1 and g2, the first and second internal electrodes are not short-circuited or are not outside of a design range of the present embodiment, whereby cutting precision may be improved.

Referring to FIG. 9, the external electrodes may be formed on one surface of the ceramic body so as to be connected to the internal electrodes. More specifically, the first and third external electrodes 231 and 233 may be formed to respectively be connected to the first and second lead-out portions 221a and 221b of the first internal electrode exposed to the first surface of the ceramic body, and the second external electrode 232 may be formed to be connected to the first lead-out portion 222a of the second internal electrode exposed to the first surface thereof.

Likewise, the fourth and sixth external electrodes 234 and 236 may be formed to respectively be connected to the third and fourth lead-out portions 221c and 221d of the first internal electrode exposed to the second surface of the ceramic body, and the fifth external electrode 235 may be formed to be connected to the second lead-out portion 222b of the second internal electrode exposed to the second surface thereof.

In the present invention, the first and second electrodes may have different polarities. The first, third, fourth, and sixth electrodes may have the same polarity and the second and fifth electrodes may have the same polarity.

Similar to the above-mentioned embodiment, the first, third, fourth, and sixth external electrodes 231, 233, 234, and 236 may be connected to portions of the first to fourth lead-out portions 221a to 221d of the first internal electrode that do not overlap the first and second lead-out portions 222a and 222b of the second internal electrode.

In the right view of FIG. 9, the overlapping areas between the first to fourth lead-out portions 221a to 221d of the first internal electrode and the first and second lead-out portions 222a and 222b of the second internal electrode are denoted by arrows, and the lead-out portions of the second internal electrode that do not overlap the lead-out portions of the first internal electrode are denoted by dotted lines.

According to the embodiment of the present invention, the lead-out portions of the first internal electrode and the lead-out portions of the second internal electrode may be exposed to the same surface, have the overlapping areas, and be connected to the external electrodes having different polarities.

According to the embodiment of the present invention, the insulation layers 241 to 246 may be formed on one surface of the ceramic body. More specifically, the first and second insulation layers 241 and 242 maybe formed on the first surface of the ceramic body, the third and fourth insulation layers 243 and 244 maybe formed on the respective third and fourth surfaces thereof, and the fifth and sixth insulation layers 245 and 246 may be formed on the second surface thereof.

The first insulation layer 241 formed on the first surface of the ceramic body may be formed between the first and second external electrodes 231 and 232, and the second insulation layer 242 formed on the first surface of the ceramic body may be formed between the second and third external electrodes 232 and 233. The first and second insulation layers 241 and 242 may be formed to cover the lead-out portions 221a and 221b of the first internal electrode and the lead-out portion 222a of the second internal electrode that are exposed to the first surface. The first and second insulation layers 241 and 242 maybe formed to entirely cover the overlapping areas between the first and second lead-out portions and be formed to cover the exposed areas of the lead-out portions of the first internal electrode and the lead-out portion of the second internal electrode.

In addition, according to the embodiment of the present invention, as shown in FIG. 9, the first and second insulation layers 241 and 242 maybe formed to completely cover the first surface of the ceramic body between the first and second external electrodes.

In addition, although not shown, according to the embodiment of the present invention, the first and second insulation layers 241 and 242 may be formed to cover only the overlapping areas between the lead-out portions 221a and 221b of the first internal electrode and the lead-out portion 222a of the second internal electrode while having predetermined intervals from the first to third external electrodes 231 to 233.

Likewise, the fifth and sixth insulation layers 245 and 246 may be formed on the second surface of the ceramic body. The fifth insulation layer 244 may be formed between the fourth and fifth external electrodes 234 and 235, and the sixth insulation layer 246 may be formed between the fifth and sixth external electrodes 235 and 236. The fifth and sixth insulation layer may be formed in various manners, similar to the forming of the first and second insulation layers as described above.

According to the embodiment of the present invention, the third and fourth insulation layers 243 and 244 may be formed on the respective third and fourth surfaces of the ceramic body to which the ends of the first and second internal electrodes 221 and 222 are exposed.

As shown in FIGS. 9 and 10, the first and third lead-out portions 221a and 221c of the first internal electrode and the first and second lead-out portions 222a and 222b of the second internal electrode may be formed while having predetermined intervals g1 and g2 from the third surface of the ceramic body, such that the dielectric layer is exposed to the third surface thereof. The third insulation layer 243 may be connected to the dielectric layer exposed to the third surface of the ceramic body.

In addition, the second and fourth lead-out portions 221b and 221d of the first internal electrode and the first and second lead-out portions 222a and 222b of the second internal electrode may be formed while having predetermined intervals g1 and g2 from the fourth surface of the ceramic body, such that the dielectric layer is exposed to the fourth surface thereof. The fourth insulation layer 244 may be connected to the dielectric layer exposed to the fourth surface of the ceramic body.

According to the embodiment of the present invention, the insulation layers may be formed of the same material as or similar material to a material of the dielectric layer. When the insulation layers are connected to the dielectric layers, adhesion strength between the insulation layers ad the ceramic body may be improved.

The insulation layers cover the ends and the lead-out portions of the first and second internal electrodes exposed to one surface of the ceramic body, whereby a short-circuit between the internal electrodes may be prevented and an internal defect such as deterioration in humidity resistance characteristics, or the like, may be prevented.

According to the present embodiment, since even the lead-out portions of the first and second internal electrodes are overapped, capacitance of the multilayer ceramic capacitor may be increased. In addition, a distance between the first and second internal electrodes to which external polarities are applied may be relatively close, such that a current loop may be shortened. Therefore, ESL may be reduced.

In addition, although not shown, the first or second internal electrode may include at least two lead-out portions. In addition, the first and second internal electrodes may include overlapping lead-out portions having different polarities. Further, the lead-out portions formed in the first and second internal electrodes may be exposed to the same surface of the ceramic body or may be exposed to different surfaces thereof. The number, positions, and the like, of the lead-out portions formed in the internal electrode may be variously adjusted by those skilled in the art.

As set forth above, according to the embodiments of the present invention, the internal electrodes may be formed to have increased areas while allowing a minimal margin portion to remain on the dielectric layer of the ceramic body. Therefore, the overlapping area between the first and second internal electrodes is increased, whereby a high capacitance multilayer ceramic capacitor may be realized.

According to the embodiments of the present invention, even the lead-out portions of the first and second internal electrodes are overapped, such that capacitance of the multilayer ceramic capacitor may be increased.

In addition, a distance between the first and second internal electrodes to which external polarities are applied may be relatively close, such that a current loop may be shortened. Therefore, ESL may be reduced.

According to the embodiments of the present invention, the insulation layers formed on the ceramic body cover the lead-out portions of the first and second internal electrodes exposed to one surface of the ceramic body, whereby a short-circuit between the internal electrodes may be prevented and an internal defect such as a deterioration in humidity resistance characteristics, or the like, may be prevented.

According to the embodiment of the present invention, the insulation layer may be connected to a portion of the dielectric layer in which the internal electrode is formed, such that adhesion strength between the insulation layer and the ceramic body may be improved.

According to the embodiments of the present invention, the height of the insulation layer maybe adjusted. When the height of the insulation layer is lower than those of the first and second external electrodes, the multilayer ceramic capacitor may be more stably mounted on the circuit board.

In the multilayer ceramic capacitor according to the embodiments of the present invention, current may flow to the internal electrodes through the plurality of external electrodes. Therefore, a magnitude of an inductance component connected in series with a capacitance component of the multilayer ceramic capacitor may be significantly reduced.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body;
   first and second internal electrodes provided within the ceramic body and including lead-out portions exposed to a first surface of the ceramic body and having an overlapping area. the overlapping area being exposed to the first surface of the ceramic body;
   external electrodes formed on the first surface of the ceramic body and connected to the respective lead-out portions; and
   an insulation layer formed on the first surface of the ceramic body and on third and fourth surfaces thereof connected to the first surface, wherein:
   the first and second internal electrodes include ends exposed to the third and fourth surfaces of the ceramic body,
   the lead-out portions have a predetermined interval from the third or fourth surface of the ceramic body,
   the insulation layer formed on the first surface of the ceramic body has a height lower than those of the first and second external electrodes measured from the first surface of the ceramic body,
   at least one of the external electrodes protrudes from the third and fourth surfaces of the ceramic body, and
   the insulating layers formed on the third and fourth surfaces of the ceramic body have a thickness (D2), measured from the third and fourth surfaces, greater than a thickness (D1) measured from the third and fourth surfaces of the external electrodes protruding from the third and fourth surfaces.

2. The multilayer ceramic capacitor of claim 1, wherein the first internal electrode includes first and second lead-out portions exposed to the first surface of the ceramic body while having a predetermined interval therebetween,
   the first lead-out portion has a predetermined interval from the third surface of the ceramic body, and
   the second lead-out portion has a predetermined interval from the fourth surface of the ceramic body.

3. The multilayer ceramic capacitor of claim 1, wherein the second internal electrode includes a first lead-out portion having a predetermined interval from the third and fourth surface of the ceramic body.

4. The multilayer ceramic capacitor of claim 1, wherein the first and second internal electrodes are disposed perpendicularly to a mounting surface of the ceramic body.

5. The multilayer ceramic capacitor of claim 1, wherein the insulation layer is formed of a ceramic slurry.

6. The multilayer ceramic capacitor of claim 1, wherein the external electrodes are connected to portions of the lead-out portions of the first and second internal electrodes that are not overlapped with each other.

7. The multilayer ceramic capacitor of claim 1, wherein the insulation layer formed on the first surface of the ceramic body entirely covers the overlapping area of the lead-out portions of the first and second internal electrodes.

8. The multilayer ceramic capacitor of claim 1, wherein the insulation layer formed on the third or fourth surface of the ceramic body is connected to a dielectric layer exposed to the third or fourth surface of the ceramic body.

9. The multilayer ceramic capacitor of claim 1, wherein the first and second internal electrodes include lead-out portions exposed to a second surface of the ceramic body opposed to the first surface.

10. The multilayer ceramic capacitor of claim 9, wherein the first internal electrode includes third and fourth lead-out portions exposed to the second surface of the ceramic body while having a predetermined interval therebetween,
    the third lead-out portion has a predetermined interval from the third surface of the ceramic body, and
    the fourth lead-out portion has a predetermined interval from the fourth surface of the ceramic body.

11. The multilayer ceramic capacitor of claim 9, wherein the second internal electrode includes a second lead-out portion exposed to the second surface of the ceramic body and having a predetermined interval from the third and fourth surfaces of the ceramic body.

* * * * *